US006940864B2

(12) United States Patent
Abdelilah et al.

(10) Patent No.: US 6,940,864 B2
(45) Date of Patent: Sep. 6, 2005

(54) NETWORK ACCESS TRAFFIC SORTER

(75) Inventors: Youssef Abdelilah, Holly Springs, NC (US); Gordon Taylor Davis, Chapel Hill, NC (US); Jeffrey Haskell Derby, Chapel Hill, NC (US); Dongming Hwang, Cary, NC (US); Clark Debs Jeffries, Durham, NC (US); Malcolm Scott Ware, Raleigh, NC (US); Hua Ye, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 904 days.

(21) Appl. No.: 09/906,352

(22) Filed: Jul. 16, 2001

(65) Prior Publication Data

US 2003/0012209 A1 Jan. 16, 2003

(51) Int. Cl.⁷ .............................................. H04Q 12/28
(52) U.S. Cl. ........................ 370/412; 718/102; 712/203
(58) Field of Search ........................ 370/412, 389–396, 370/418; 345/419, 506, 522; 700/83, 95, 117; 718/102; 712/203

(56) References Cited

U.S. PATENT DOCUMENTS

| 5,434,848 A | 7/1995 | Chimento, Jr. et al. ....... 370/17 |
| 5,610,910 A | 3/1997 | Focsaneanu et al. ........ 370/351 |
| 5,913,028 A | 6/1999 | Wang et al. ........... 395/200.33 |
| 5,949,788 A | 9/1999 | Friedman et al. ............ 370/431 |
| 5,954,799 A | 9/1999 | Goheen et al. ............. 709/250 |
| 6,697,368 B2 * | 2/2004 | Chang et al. ............ 370/395.1 |
| 6,834,385 B2 * | 12/2004 | Bohm et al. ................ 718/102 |

FOREIGN PATENT DOCUMENTS

EP          0 817 436 A2     1/1998

\* cited by examiner

Primary Examiner—Chi Pham
Assistant Examiner—Prenell Jones
(74) Attorney, Agent, or Firm—Richard F. Frankeny; Winstead Sechrest & Minick P.C.; Josh Cockburn (57) ABSTRACT

Packetized voice, video, and data traffic (data frames) are received in a communication traffic sorter. The data frames have a dispatch priority corresponding to their transmission characteristics (flow) and a quality of service parameters. The communication traffic sorter analyzes information in data packets within each data frame and determines an optimum flow for the data frames. A data frame is assigned to a selected queue based on an analysis of the information in its data packets. A data frame may also be assigned to a queue based on a prior analysis of a data frame with like transmission characteristics. Results of analysis are stored and indexed to facilitate processing of subsequent data frames. The network access sorter has circuits to un-pack and re-pack the data frame, when called for, to allow user transmitted data to be processed to create a modified data frame. The data frame may then be dispatched with a second dispatch priority on a bus for distribution to end users where previously assigned quality of service is maintained or exceeded.

31 Claims, 7 Drawing Sheets

| Types of Traffic | Data Rates | Encoding Latency | Sensitivity to Large Buffering Latency | Sensitivity to Transmission Errors | Compressible using Lempel-Ziv? | Desireable to be Encrypted |
|---|---|---|---|---|---|---|
| G.726/G.711 Encoded Speech | 24kbps to 64kbps | less than 250 microseconds | very sensitive | $10^{-6}$ acceptable | No | perhaps, for secure voice |
| G.723.1, G.729 Encoded Speech | 5.3kbps to 16kbps | 5 to 20 milliseconds | moderately sensitive | $10^{-9}$ acceptable | No | perhaps, for secure voice |
| Video on Demand | 128kbps to 4Mbps | 30 to 60 milliseconds | moderately sensitive | $10^{-9}$ acceptable | No | perhaps, for the audio channel |
| Video Phones | 128kbps to 4Mbps | 30 to 60 milliseconds | moderately sensitive | $10^{-9}$ acceptable | No | perhaps, for the audio channel |
| Virtual Private Network Connections | up to maximum layer 1 speeds | 20 to 50 milliseconds | none | requires TCP/IP re-transmission capability | No | yes, but already encrypted at the source |
| General Web Browsing | up to maximum layer 1 | TCP/IP packet sizes | none | requires TCP/IP re-transmission capability | yes, 2x typical | No |

TABLE 1

NETWORK ACCESS TRAFFIC SORTER

TECHNICAL FIELD

The present invention relates in general to data and voice communication systems, and in particular, to systems for managing the flow of data and voice communication.

BACKGROUND INFORMATION

With the growth of electronic commerce (e-commerce), distance learning, tele-commuting, digital video entertainment, tele-gaming, and sophisticated digital audio, video, and data content accessed from just about anywhere on the planet, there is significant interest in how to safely, securely, and reliably deliver communication traffic over wired and wireless connections. However, with all this content, significant problems arise, especially at the edge of the network or at access points. These significant problems deal with how to mix all this communication traffic into a single communication channel (pipe), where the pipe may be operating at low data rates, of less than 10 Megabits per second. Difficulties arise in attempting to move the communication traffic over the "last mile" of the connection. The communication data rates over the last portion of a data connection may vary from a slow V.34 or V.90 modem (perhaps only 28.8 kbps) to a Global System for Mobile communication (GSM) wireless data connection at 57.6 kbps, a Digital Subscriber Line (DSL) modem with speeds ranging from 128 Kbits per second (Kbps) to 50 Mbps, or a cable modem operating with speeds of up to 32 Mbps. The speed over the last mile of a Wide Are Network (WAN) connection is not nearly as fast as most Local Area Network (LAN) based connections; therefore, optimizing the WAN portion of the communication traffic flow is important to overall quality of service.

Figure 4:
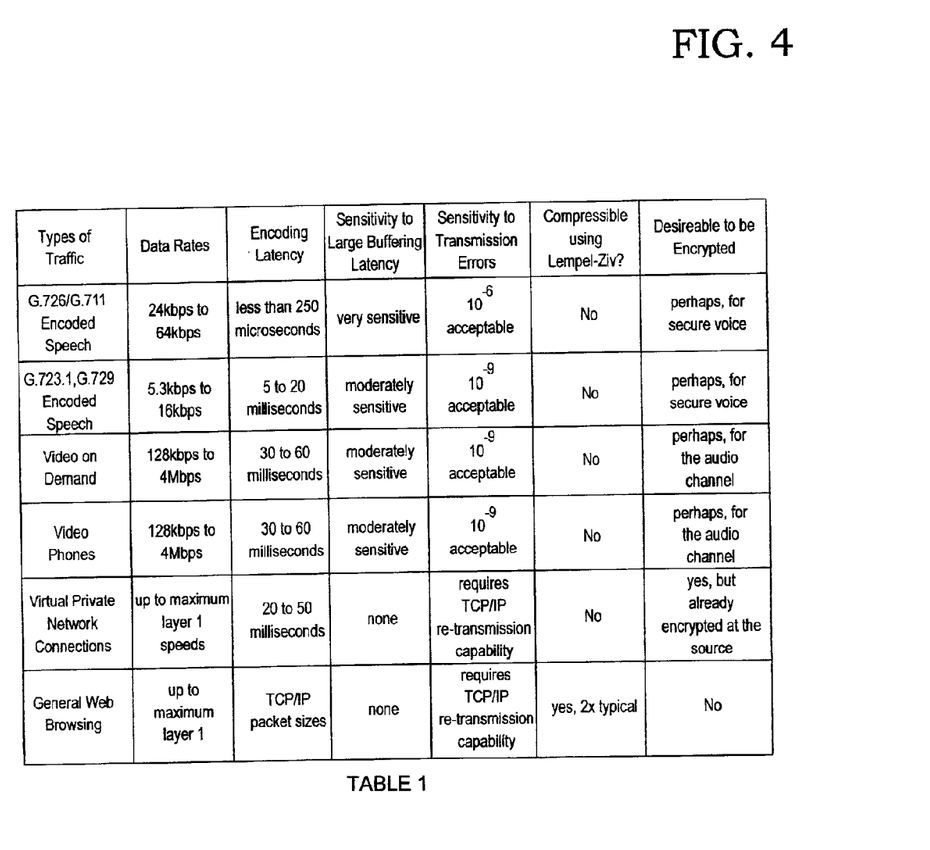
FIG. 4 is a table listing characteristics of the present network environment in which embodiments of the present invention operate.

The communication traffic in the WAN environment has widely varying needs, and yet all the traffic has to travel over the same transmission system to reach an end user. This means that all the communication traffic must be consolidated together in a reasonable manner. FIG. 4 is a table that lists example characteristics of different types of communication traffic and identifies the "environment" existing within communication networks. When all communication data are handled the same, without regard to the data type, the traffic may move more slowly, it may not be secure, and it may have additional jitter or buffering which often leads to poorer real-time delivery characteristics. Therefore, there is a need for a method and system to optimize the handling of communication traffic based on the type of data present.

SUMMARY OF THE INVENTION

Framed and packetized voice and data (data frames) from multiple sources are received in a communication traffic sorter. The communication traffic sorter analyzes the characteristics of the data frames by probing information within data packets in the data frames and determines what is an optimum transmission method. Data frames are assigned to dispatch queues based on results of the analysis in order to preserve or improve transmission characteristics of bandwidth, encryption, error rates, etc. Various communication traffic, once analyzed, has a predetermined and assigned index or key to a dispatch queue or other processing. User data within the data frames may be processed when necessary to improve transmission characteristics and throughput. When data frames arrive, they are analyzed and assigned a dispatch queue where they are temporarily stored. The data frames are then dispatched onto an output based on the protocol of their dispatch queue for transmission to an end user. The communication traffic sorter optimizes overall data traffic so the quality of service of end users is either maintained or improved.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views. In the following description, the terms packet and frame may be used interchangeably as a fixed block of data transmitted as a single entity.

FIG. 4 is a table that lists characteristics of various types of communication traffic (data types) that may exist on a communication network. The following defines and explains terms used in FIG. 4:

G.711 is an International Telecommunication Union (ITU) standard for speech encoders/decoders (Codecs) that provides toll quality audio at 64 Kbps using either A-Law or mu-Law Pulse Code Modulation (PCM) methods. This uncompressed digital format is a required Codec for H.323 audio and video conferencing in order to allow easy connections to legacy telephone networks.

G.726 is an ITU standard for speech Codecs that uses the Adaptive Differential PCM (ADPCM) method to compress 64 Kbps PCM into 40, 32, 24 or 16 Kbps depending on an available channel bandwidth. G.726 generally replaces G.721 and G.723. G.729 is an ITU standard for speech Codec that uses the Code Excited Linear Predictive (CELP) method and provides toll quality audio at 8 Kbps.

Video on demand describes a system with the ability to start delivering a movie or other video program to an individual (e.g., using a Web browser or TV set) whenever the user requests it.

A Video phone may be either a telephone with built-in video capability, including a camera and screen or a line of video phones from AT&T. The second system uses AT&T's Global VideoPhone Standard technology, which is also licensed to other manufacturers.

A Virtual Private Network (VPN) is a private network that is configured within a public network. For years, common carriers have built VPNs that appear as private national or international networks to the customer, but physically share backbone trunks with other customers. VPNs enjoy the security of a private network via access control and encryption, while taking advantage of the economies of scale and built-in management facilities of large public networks. Today, there is tremendous interest in VPNs over the Internet, especially due to the constant threat of hacker attacks. The VPN adds that extra layer of security, and a huge growth in VPN use is expected.

Web browsing is a process that employs a program that serves as a user's front end to the World Wide Web on the Internet. In order to view a site, a user types its address or "universal resource locator" (URL) into the browser's Location field, for example, www.computerlanguage.com, and the home page of that site is downloaded. The home page is an index to other pages on that site that a user can jump to by clicking a "click here" message or an icon. Links on that site may take you to other related sites.

Transmission Control Protocol/Internet Protocol (TCP/IP) is a communications protocol developed under contract from the U.S. Department of Defense to internetwork dissimilar systems. Invented by Vinton Cerf and Bob Kahn, this de facto UNIX standard is the protocol of the Internet and has become the global standard for communications.

Lempel-Ziv-Welch (LZW) or sometimes Lempel-Ziv is a compression method that stems from two techniques introduced by Jacob Ziv and Abraham Lempel. A version of LZW (LZ77) creates pointers back to repeating data, and another version of LZW (LZ78) creates a dictionary of repeating phrases with pointers to those phrases. Unisys researcher Terry Welch created an enhanced version of these methods, and Unisys holds a patent on the algorithm. LZW is widely used in many hardware and software products.

Data frames received in exemplary communication traffic sorters 100 or 300 may have transmission characteristics as listed in FIG. 4. The communication traffic sorters 100 or 300 process the data frames by considering these types of transmission characteristics to optimize the delivery of user data according to embodiments of the present invention.

One of the current basic problems with the last portion of the communication traffic flow for a WAN 501 (network access point for an end user) is the fairly independent development which occurred for transmission systems, real-time traffic management systems, and network processing systems. This leads to difficulties in achieving global optimization of all three systems for network access points where data rates are often quite slow. Solving the global optimization problem for these three major systems requires a careful analysis of the characteristics represented in the table in FIG. 4 for of each kind of network communication traffic.

Embodiments of the present invention employ a communication traffic sorter mechanism to recognize the key aspects of the various communication traffic discussed relative to FIG. 4 as well as the peculiarities of the transmission system The exemplary communication traffic sorters 100 or 300 operate to achieve an optimum transport of the communication traffic. An optimum transport of the communication traffic means the delivery of the communication traffic over the "last mile" or access point at the highest possible speed, using the most secure means when security is needed and delivering user data with the minimum jitter, minimum buffering and improved reliability. Embodiments of the present invention describe techniques usable to achieve global optimization across all three systems employed for access points: transmission systems, real-time traffic management systems and network processing systems.

Figure 1:
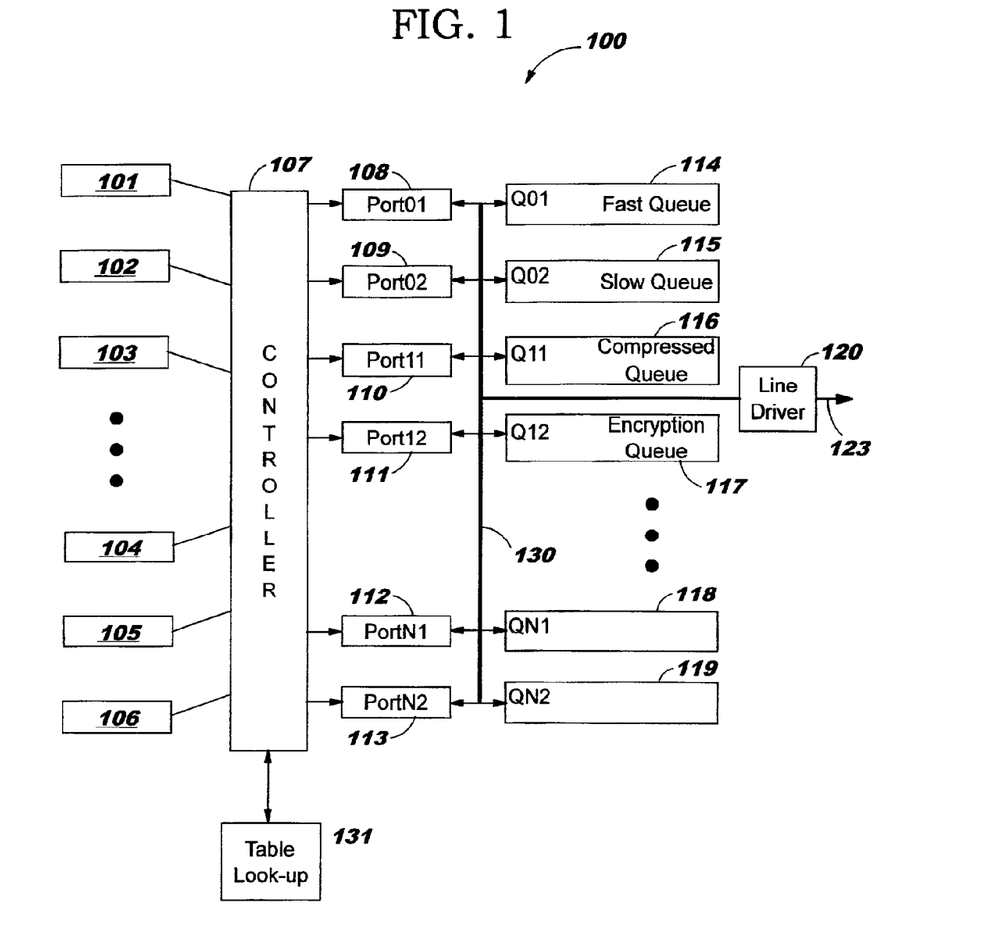
FIG. 1 is a block diagram of a communication traffic sorter and queues according to embodiments of the present invention.

FIG. 1 is a block diagram of portions of a transceiver with a communication controller 107 and appropriate queues 114–119 incorporated to make a communication traffic sorter 100 according to embodiments of the present invention. Inputs 101–106 represent communication data, voice, and video (data frames) arriving in parallel from a variety of sources to communication controller 107. In FIG. 1, the data frames are arriving from parallel sources, however the data frames may also arrive multiplexed onto a serial network link (e.g., a cable system). Communication controller 107 directs data frames, via ports 108–113, to various queues 114–119 based on an analysis of the data packets in the data frames according to embodiments of the present invention. Data frames stored in queues 114–119 are then dispatched onto bus 130 based on a protocol of each queue. One protocol of the queues 114–119 is a hierarchy of dispatch priorities. Queues with the highest priority would dispatch all their stored data before a queue of lower priority would be allowed to dispatch data to bus 130 and then through line driver 120 to output 123. In embodiments of the present invention, the exemplary queues (114–119) may have limited function where the queue simply dispatches data based on a hierarchical priority. Other queues may actually do an amount of processing of data packets within the data frame. For example, compression queue 116 may unpack the data frame, compress user data and re-pack the data frame before dispatching it to the output 123.

Other embodiments of the present invention have a separate processing unit within communication controller 107 (e.g., a digital signal processor (DSP)) that does this function. In this case, communication controller 107 would direct appropriate data frames to the DSP for processing before forwarding to an appropriate queue (e.g., queues 144–119). Exemplary queues 114–119 represent queues that are in addition to those presently found in communication paths. Embodiments of the present invention add hardware providing additional queues.

Communication controller 107 may first access data to determine the flow for a received data frame. A flow may be defined by a set of data that determines a source, a destination, a protocol, etc for a data transmission. For example, one approach for data frame identification uses a tuple (a database term for a row of information). This data frame identification is sometimes called a 5-tuple (5 information units) and includes a source address (SA), destination address (DA), protocol, source port (SP) and destination port (DP). After a data frame has been identified, the user data type within the data frame is identified. To identify the data type, communication controller 107 "probes" the data packets within a received data frame for information defining the data type. While sometimes a data frame and a data packet may be used synonymously, in this disclosure a data frame refers to a construct of a particular protocol (e.g., an Ethernet frame) and a data packet refers to logical grouping of data within the data frames. A single data frame may not contain all the information necessary to completely determine a flow according to embodiments of the present invention.

Communication controller 107 determines the flow and the type of user data being transmitted in the data frame, for example, voice, video, text or just plain data. By analysis of the data in the data frame, a determination is then made as to the best queue (e.g., one of queues 114–119) which facilitates an optimum use of a data transmission bandwidth. Communication controller 107 may also do more sophisticated processing before assigning a queue 110–119 to a data frame. Real-time data, which is sensitive to latency, echo, and requires the high data bit-rate of a G.711 speech encoder/decoder (Codec), may be routed to a fast data queue (114) in DSL transceiver 100. Other speech codecs, such as G.729, require lower data bit rates, are more sensitive to transmission errors, but are only moderately sensitive to latency and echo, and thus may be routed through an interleaving path. The interleaved path is a slower data path through the transceiver 100, but it offers a better reliability to burst errors because of the interleaving process (reordering data packets) performed by communication controller 107 prior to storing the data in an interleaved queue.

Actions to take in processing data frames may be determined by examining how data types are categorized as listed in the table in FIG. 4. Embodiments of the present invention identify the appropriate data or speech within the data frame and the corresponding predetermined parameters, as shown in the table in FIG. 4, that may apply to the data frame.

Basically communication data may be classified as follows:

1) Real-time data (dependencies are: delay, jitter, echo, bandwidth, etc.): Real-time data is delay sensitive and needs a high bit rate and low latency. A voice over DSL voice application, for example, must be transmitted through a path with small delay and low Bit Error Rate (BER) which a fast path queue may offer.

2) Interactive data: Interactive data utilizes an interactive mode which is not latency sensitive or echo sensitive as is voice over DSL. In the interactive mode, a data frame may be forwarded to a slower data path queue. After categorizing the incoming data frames based on a line quality, BER, echo cancellation, jitter, and bandwidth allocation, the incoming data frames may be forwarded to an appropriate queue. For example the queues may be selected from the following exemplary queues: fast queue 110, slow queue 111, compressed queue 112, encryption queue 114 or other queues (e.g., QN1 115 and QN2 116) with various dispatch priorities or processing capabilities.

The number of queues may be increased to achieve a better performance which, in turn may result in a corresponding increase in system complexity.

Figure 7:
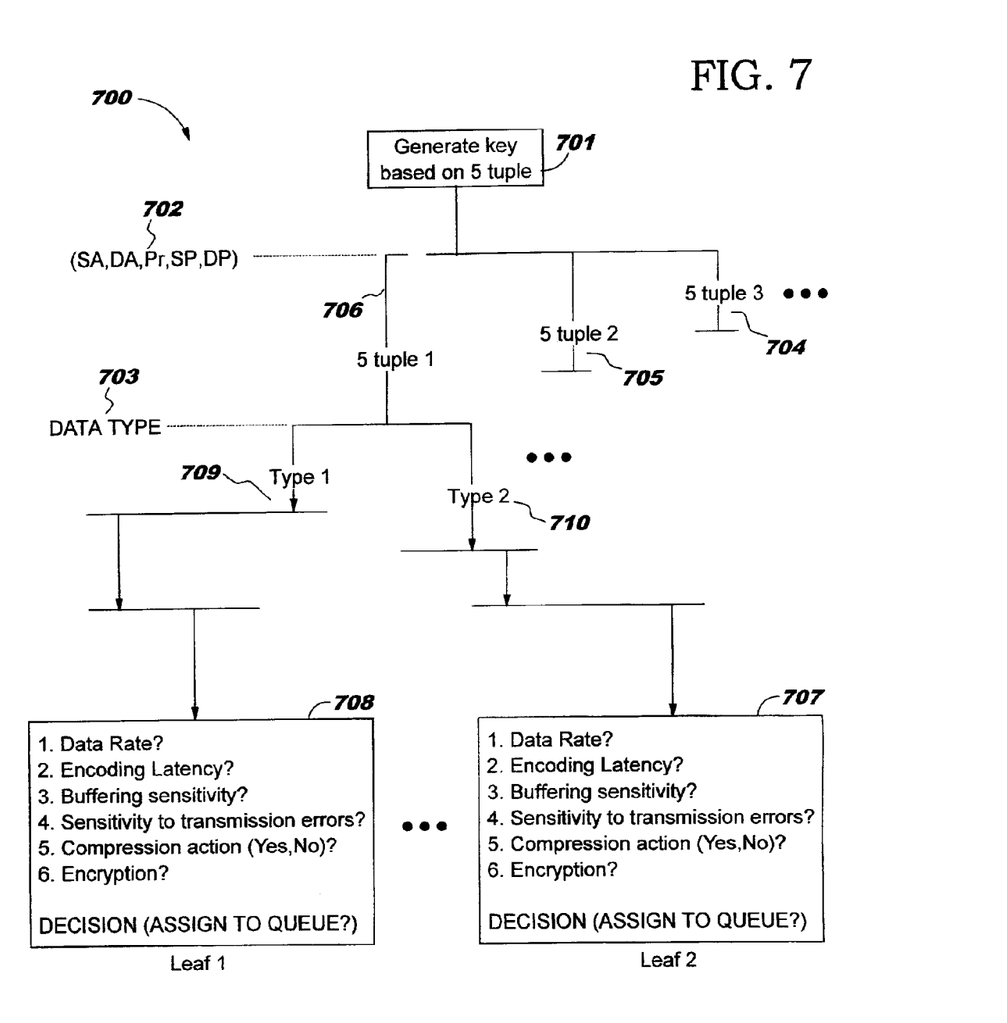
FIG. 7 illustrates a tree structure for identifying the flow of data communication according to embodiments of the present invention.

Communication controller 107 uses a method or algorithm according to embodiments of the present invention to optimize the communication traffic by routing the communication traffic via the best queue in order to guarantee quality, speed, and low latency at lower Bit Error Rate (BER). Furthermore, the algorithm may also build a traffic profile (tree structure 700) that categorizes the data frame as to its content, for example, speech, video, data to be compressed, interleaved, etc. The algorithm may also choose the appropriate latency, bandwidth, and BER, tolerated by the communication path, for appropriate speech compression that was negotiated for the connection. Depending on the compressibility of data, communication controller 107 may determine that it is advantageous to unpack and then re-pack the data frame. For example, it may be advantageous to unpack Asynchronous Transfer Mode (ATM) Cells in an Internet Protocol (IP) data packet (datagram) just to compress the data and then re-pack the data for transmission through an appropriate queue at the transceiver 100. A datagram is defined as a data frame with all the information necessary to deliver it to a destination. In this context, each datagram contains at least source and destination addresses as well as user data. An encryption queue 117 may be added that services such encrypted data and benefits data security. One of the available queues (e.g., 118) may be identified for general traffic with a lowest priority. A received data frame with a data type which cannot be classified may be forwarded through this general traffic queue 118 with the lowest priority. Queues 110–116 have predetermined hardware protocols (e.g., priority) that determines how they dispatch their stored packets to bus 130 and thus to output 123 where the data frames proceed to an end user. The task of communication controller 107 is not to change these protocols but rather to analyze incoming communication traffic and determine to which queue to assign the data packets to facilitate an improved communication traffic flow without compromising the transmission parameters (e.g., bandwidth, security, error rates, etc.) negotiated by a user of the network. Using embodiments of the present invention, all users receive equal or better performance for their communication traffic over a particular network.

Figure 3:
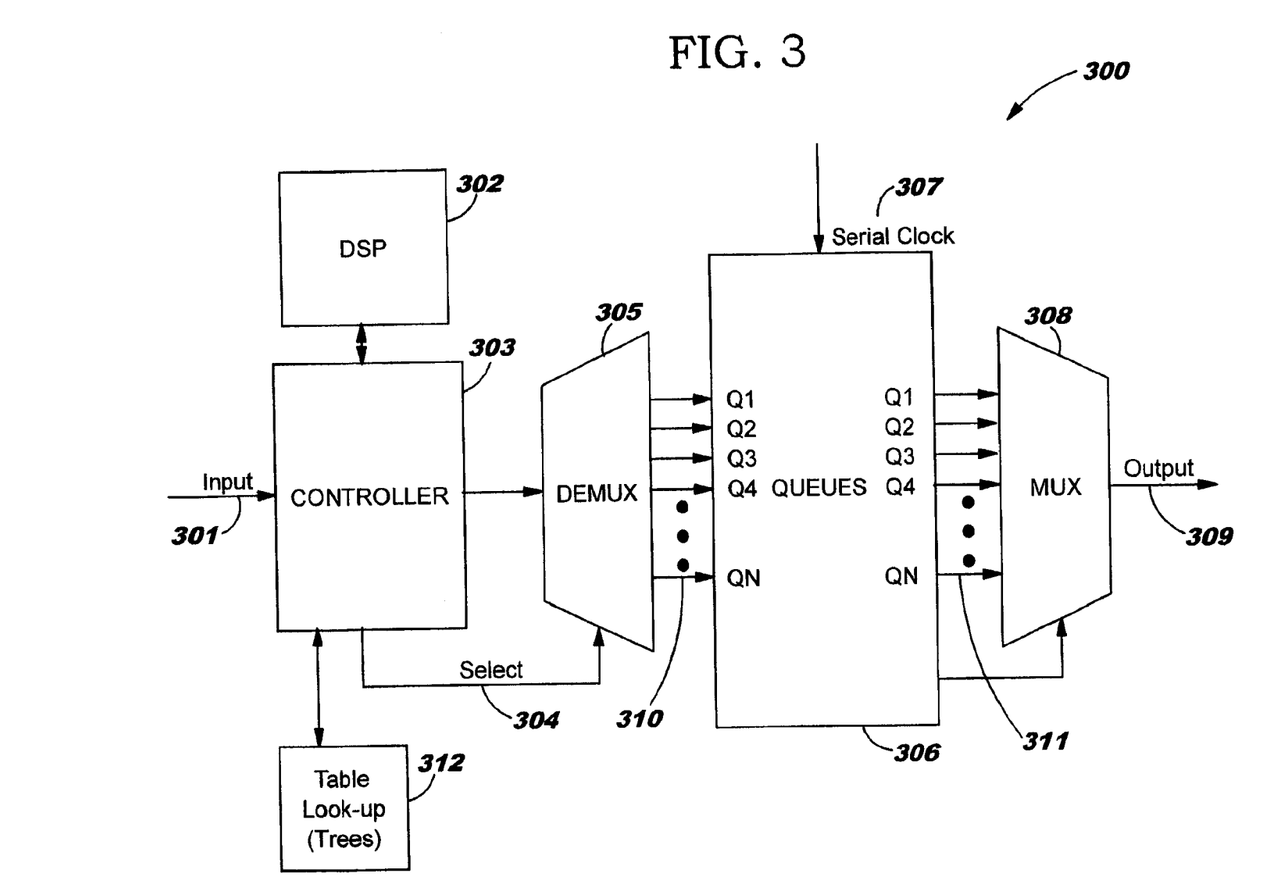
FIG. 3 is a block diagram of a system to implement embodiments of the present invention.

FIG. 3 is a more detailed block diagram of hardware in one embodiment of the present invention for a communication traffic sorter 300. In this embodiment, the controller 303, DSP 302, demultiplexer (DEMUX) 305, MUX 308 and queues 306 are considered elements of communication traffic sorter 300. Input data 301 may be serial communication traffic from many sources coupled to a controller function 303. Controller 303 receives frames of data (data frames) which define data grouped together based on its transmission protocol (e.g., an Ethernet frame). These data frames are made up of data packets which are logical groupings of data within a data frame. For example, control information would be a logical grouping within a data frame. Controller 303 reads the data packets and makes a determination of transmission characteristics of the data frame, for example, the type of data being transmitted, source and destination addresses, data encryption, etc. Controller 303 may first examine the source and destination address of the data frame to determine a communication traffic "flow" of the data frame. While a source and destination address may not be sufficient to determine a flow for the data frame, it may be one of the elements in a tree search for the flow. The communication traffic flow may be thought of as the transmission characteristics that define a particular communication between a source and a destination. These transmission characteristics may include source address (SA), destination address (DA), protocol, and port identification (source and destination) and sometimes are referred to as a 5 tuple. Indexes or keys enable accessing table look up 312 (e.g., implementing a tree structure 700) where previous same flows for data frames have been tabulated as to the characteristics of the data packets within the data frames. If controller 303 can make a determination that quality of service (QOS) for the data frame may be improved by processing information in the data frame, then the data frame may be "unpacked". Digital signal processor (DSP) 302 is used to do any necessary signal processing (compression, encryption, etc.). If the transmitted data within a data frame is to be processed, then controller 303 sends the unpacked data to DSP 302. After processing, the data is sent back to controller 303 which re-packs the data frame for forwarding to DEMUX 305. If controller 303 determines which queue is appropriate for the data frame being processed, then a select signal 304 is generated so the data packet is directed to the appropriate queue in Queue unit 306. The queues in Queue unit 306 have their dispatch protocol built-in. For example, a data frame serialize clock 307 may be used with queue logic to direct when the data frames from input 301 are dispatched to output 309. MUX 308 is used to re-serialize the data frames from parallel queue outputs 311 to serial output 309. If controller 303 cannot determine a dispensation for a data frame in an allotted time (e.g., requires more than one data frame to determine a new queue), then the data frame is forwarded with its original dispatch priority and data packets.

Controller 303 may be a state machine, a programmable processor or shared resources of DSP 302 and still be within the scope of embodiments of the present invention. As data frames are received by controller 303, it builds a table or tree by selecting applicable characteristics (refer to FIG. 7) and assigning a key for the communication traffic flow corresponding to these characteristics. The key is an index to a "leaf" (refer to FIG. 7) in the tree that describes how the data frames in the particular flow are handled according to embodiments of the present invention. A tree for a flow is "built" by a communication traffic sorter (e.g., 100 or 300) receiving data frames for a particular flow. Once the tree has been built, a key or index is generated generating a short cut to the actions (leaf) to take in processing received data frames. For example, a "hash" of data defining a unique flow, corresponding to a data frame, may be used to generate a unique key to access or search the tree. Hashing refers to methods of generating a unique key from a set of data.

Figure 2:
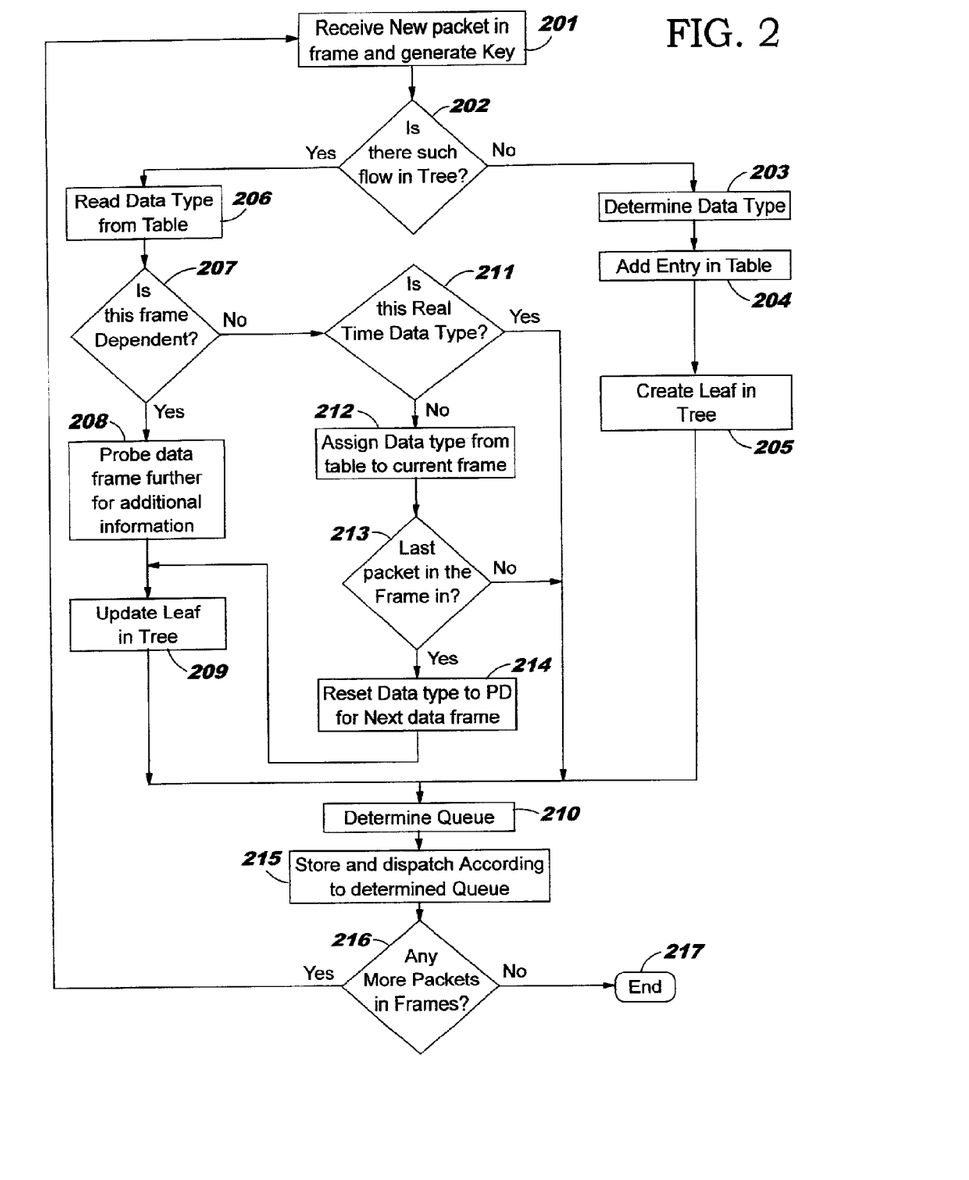
FIG. 2 is a flow diagram of one embodiment of the present invention.

FIG. 2 is a flow diagram that illustrates method steps for communication data traffic management according to embodiments of the present invention. Exemplary communication traffic sorters 100 or 300 may use the method steps of FIG. 2 in accordance with embodiments of the present invention. In step 201, a new packet in a data frame is received and a hash key may be generated to assign a unique key to the data frame. In step 202, communication controller 107 or traffic sorter 300 tries to identify the type of communication traffic flow (flow) in the data frame and to determine if there is a definition of such a flow already within a stored table or "tree" (refer to FIG. 7). For example, part of a flow identification may be a determination that a data frame has an Internet Protocol (IP) source and destination address. Knowing the source and destination address, in this example it is an IP communication, does not in itself determine what kind of data is being communicated (e.g., voice, video, etc.) so more information may be required to complete a determination of the flow. An identified flow has a specific user transmitted data type, such as voice, data, video, etc., associated with it. If the result of the test in step 202 is YES, then the flow is recognized and information may be read from the table (leaf) corresponding to the recognized flow. In step 206, the data type for the recognized flow is read from a table or tree (e.g., tree 700). Sometimes due to previous a data frame identification process, some data types may be marked as Frame Dependent (FD). FD means that during data packet probing of a first received data frame, communication controller 107 identified that more data frames are needed to determine a specific data type for such a flow. For example, if the flow is in a "call negotiation" such as H.323, it will take more than one data frame to determine, for example, what type of speech encoder/decoder (codec) is used. H.323 is an ITU standard for realtime, interactive voice and video conferencing over Local Area Networks (LANs) and the Internet. Widely used for IP telephony, H.323 allows any combination of voice, video and data to be transported. H.323 specifies several video codecs, including H.261 and H.263, and audio codecs, including G.711 and G.723.1. Gateways, gatekeepers and multipoint control units (MCUs) are also covered. Therefore, when receiving data frames corresponding to an H.323 communication, the data frame first received may have its data type marked as FD to flag that further processing of subsequent data frames is needed before a complete determination is made as to how to possibly modify (e.g., assign different queue priority) its present transmission characteristics.

In step 207, a test is done to determine if the data frame is FD. If the data frame is FD, then the data frame is probed further in step 208 to determine more information on the data frame. In step 209, the leaf (defining elements in the tree determining the complete flow) in the tree is updated to establish a set transmission characteristics for the particular flow for the connection. Once the leaf has been updated in step 209, embodiments of the present invention determine by analysis the best queue for the data frame in step 210 and then the data frame is stored in the selected queue in step 215 for forwarding. If the result of the test in step 207 is NO, then it is determined that the data frame is not FD. Next, in step 211, a test is done to determine if the data frame contains real-time data. If the data frame has real-time data, then the data frame is stored and dispatched according to its appropriate queue (usually fast queue) and the data frame is forwarded in step 215. If the result of the test in step 211 is NO, then the data frame does not contain real-time data and the data type determined in step 206 is assigned in step 212 and an appropriate queue is determined. In step 213, a determination is made as to whether the last packet in the data frame is the last one as part of a larger file transaction. If the result of the test in step 213 is NO, then the queue for the data frame is determined in step 210 and the data frame is stored and dispatched according to its determined queue in step 215. If the data frame is not the last in a larger file transaction, then more data frames may be needed for further analysis. Such a data frame may contain data which may be of a particular file type, for example, like File Transfer Protocol (FTP). FTP is a protocol used to transfer files over a TCP/IP network (Internet, UNIX, etc.). FTP includes functions to log onto the network, list directories and copy files. Such a file transfer may contain files of different types, for example, they may be images, zipped data, or compressible and non compressible (text or binary)data. In these cases, an identification needs to be made, at the application level layer, to determine the file type during the same transfer session in case multiple file types occur during a single transfer session. If multiple file types occur during a single transfer session, then at each end of the data frame, which identifies the file type, the leaf in the Tree is reset to FD (step 214) for the next data frame where different file identification may be needed. This type of deep probing of data packets in data frames enhances the identification in a very detailed manner. In step 214, the data type is reset to packet dependent (PD) for the next data frame. The leaf in the tree is then updated in step 209 and in step 210 the queue is determined. The data frame is then stored in the determined queue in step 215 and in step 216, a test is done to determine if any further communication traffic exists. If the result of the test in step 216 is YES, then a branch to step 201 receives a new data frame. If the result of the test in step 216 is NO, then the communication process is ended in step 217.

If the result of the test in step 202 is NO, then the flow is not recognized and in step 203 the process of data frame probing to determine the data type is started. This involves a tree search and leaf updates if the data frame is either incomplete or in need further processing, for example, as may be the case in H.323 handshakes. H.323 is an ITU standard for realtime, interactive voice and video conferencing over LANs and the Internet. Widely used for IP telephony, it allows any combination of voice, video and data to be transported. H.323 specifies several video codecs.

Most likely, in H.323 handshakes, more than one data frame is necessary to determine the type of speech coder used and to identify the data type. If no determination is made during the first data frame in step 203, then the FD type is flagged in creating the leaf of the tree in step 205. After step 205, the queue is determined in step 210 and the current data frame is forwarded in step 215. This insures that the connection in the flow is uninterrupted until the next data frame is received. When the next data frame is received, the process will follow the left-hand side of the flow chart, as described above, beginning with step 206.

During the queuing process, each data frame is queued according to the results of analysis of the data frame (probing) and then forwarded to the communication pipe in step 215. A test is done in step 216 to determine if there are any more frames. If the result of the test in step 216 is NO, then the method is ended in step 217. If the result of the test in step 216 is YES, then a branch is made to step 201 to receive new frames. The communication process is repeated again until there are no data frames to be forwarded.

Figure 5:
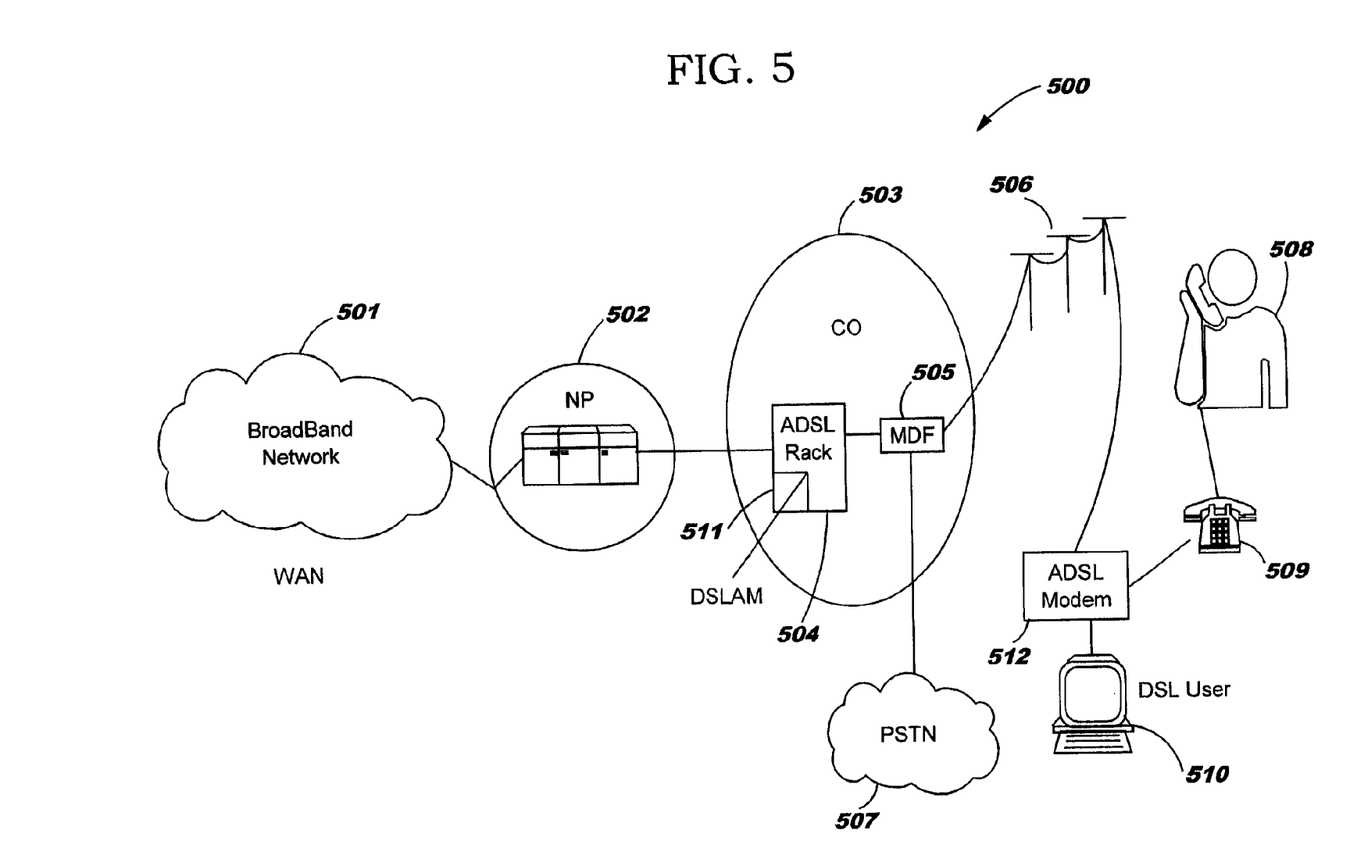
FIG. 5 is a block diagram of a communication system illustrating units which may make use of embodiments of the present invention.

FIG. 5 is a block diagram of a communication network 500 where embodiments of the present invention may be used. A Broadband Network (wide area network) WAN 501 illustrates a connection to a particular telephone user 508 or a Digital Subscriber Line (DSL) user 510. WAN 501 is coupled to asymmetrical DSL (ADSL) Rack 504 which may be found in an exemplary Central Office (CO) 503. Embodiments of the present invention may be located in the Digital Subscriber Line Access Multiplexer (DSLAM) 511 within ADSL rack 504. ADSL rack 504 is coupled to communication lines (e.g., 506) with Main Distribution Frame (MDF) 505. PSTN 507 is also coupled to MDF 505. Communication lines 506 (telephone lines) are coupled to ADSL modem 512 which interfaces computer DSL user 510 to the network. Telephone user 508 may be coupled on the same communication lines 506 via a telephone 509. A network access traffic sorter 300, according to embodiments of the present invention, may be located in DSLAM 511 and would receive communication data frames via network processor (NP) 502. These data frames would be queued according to embodiments of the present invention and dispatched through MDF 505 to communication lines 506 and ultimately to a user 508 or 510.

Figure 6:
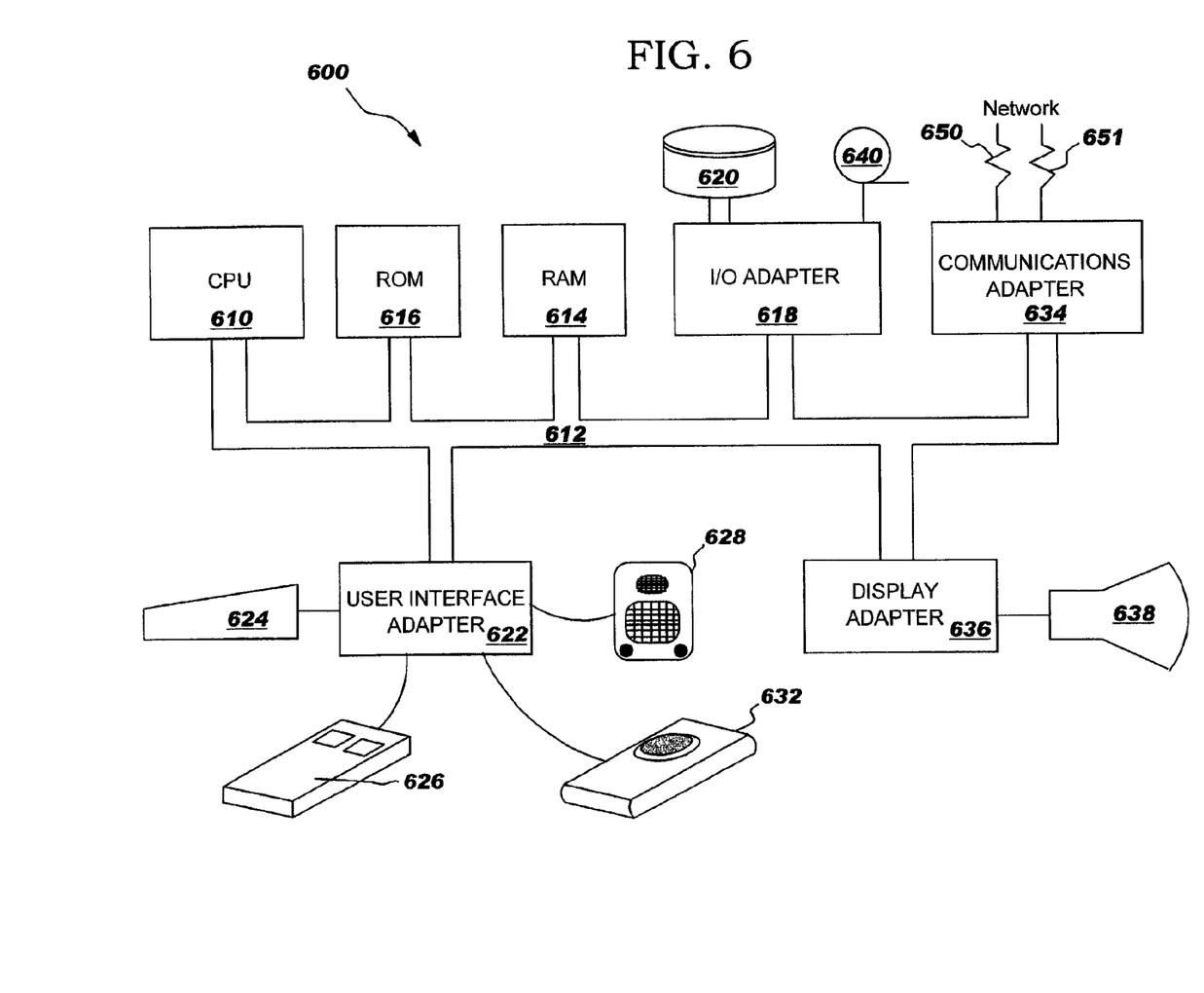
FIG. 6 is data processing system which is configured to use methods according to embodiments of the present invention to implement a communication traffic sorter.

FIG. 6 is a high level functional block diagram of a representative data processing system 600 suitable for practicing the principles of the present invention. Data processing system 600, includes a central processing system (CPU) 610 operating in conjunction with a system bus 612. CPU 610 may employ a VLSI processor chip. System bus 612 operates in accordance with a standard bus protocol, such that as the ISA protocol, compatible with CPU 610. CPU 610 operates in conjunction with read-only memory (ROM) 616 and random access memory (RAM) 614. Among other things, ROM 616 supports the Basic Input Output System (BIOS), RAM 614 includes DRAM (Dynamic Random Access Memory) system memory and SRAM (Static Random Access Memory) external cache. I/O Adapter 618 allows for an interconnection between the devices on system bus 612 and external peripherals, such as mass storage devices (e.g., a hard drive, floppy drive or CD/ROM drive), or a printer 640. A peripheral device 620 is, for example, coupled to a peripheral control interface (PCI) bus and I/O adapter 618 therefore may be a PCI bus bridge. User interface adapter 622 couples a user input device, such as a keyboard 624 to the processing devices on bus 612. Data processing system 600 may be selectively coupled to a telecommunications network through communications adapter 634 and input 650 and output 651. Communications adapter 634 may include, for example, a modem for connection to a telecom network and /or hardware and software for connecting to a computer network such as a local area network (LAN) or a wide area network (WAN). CPU 610 may be programmed to provide the function of a network traffic access sorter according to embodiments of the present invention. Communication adapter 634 has input 650 where data frames are received, processed and queued according to embodiments of the present invention and dispatched to output 651.

FIG. 7 illustrates a "tree" search structure which may be implemented as a lookup table according to embodiments of the present invention. A controller 107 or 303 would receive a data frame in step 701. A hash key may be generated to give the flow an index. A first branch of the tree may be determined by a 5 tuple (e.g., 5 parameters) 702 for the data frame. In this example, the 5-tuple 702 has parameters of a source address (SA), a destination address (DA), a protocol, a source port (SP) and a destination port (DP). Depending on a data packet's 5-tuple, as in the TC/IP frame header 5-tuple, a branch occurs at this point of the tree, for example, if the data frame corresponds to path 706 (5-tuple 1). The next piece of information is the data type 703 (refer to table 1). If the data frame has 5-tuple 1-706 and the data type is Type 1-709 (e.g., refer to Types of Traffic in FIG. 4), then a search may arrive at exemplary leaf 1-708 where information about the communication flow would be assembled analyzed to determine a queue (e.g., 114–119). If the flow for the data 5 frame was already determined, then the flow would be recognized and a key (step 701) would lead directly to in leaf 1-708 directing an assigned queue. The particular 5-tuple 1 (branch 706) may also have data type 2-710 in which case leaf 2-707 would be accessed with a corresponding different queue for data type 2-710. Tree 700 is only partially populated and is shown to illustrate the concept of a tree for communications flows. In actual practice the Tree 700 may be implemented in a lookup table format. Different recognized methods may be employed for generating and searching tree structures (refer to FIG. 7), for example in exemplary communication traffic sorters 100 and 300 and still be within the scope of the present invention.

Although the present invention and its advantages have been described in detail, it should be understood that various changes, substitutions and alterations can be made herein without departing from the spirit and scope of the invention as defined by the appended claims.

What is claimed is:

1. A method for managing communication network access comprising the steps of:
   receiving a data frame in a communication traffic sorter, said data frame comprising a plurality of data packets and said data frame having first transmission characteristics;
   analyzing contents of said data packets to generate analysis results;
   modifying selected data of said data frame in response to said analysis results to generate a modified data frame;
   storing said modified data frame in a first dispatch queue in response to said analysis results; and
   dispatching said modified data frame from said first dispatch queue according to a queue transmission priority of said first dispatch queue.

2. The method of claim 1, further comprising the step of:
   storing selected analysis results of said analyzing step, wherein said selected analysis results are assigned an index, said index generated by processing selected data of said data frame.

3. The method of claim 1, further comprising the step of:
   receiving said modified data frame by an end user, wherein a prior negotiated connection service performance for user transmitted data in said data frame is maintained or improved.

4. The method of claim 1, wherein said first transmission characteristics comprise source and destination addresses, a data type, a data transmission rate, encoding latency, acceptable error rates, compressibility status, encryption status and a first transmission priority.

5. The method of claim 1, wherein said modifying step further comprises the step of data encrypting selected data packets in said data frame.

6. The method of claim 1, wherein said modifying step further comprises the step of compressing data in selected data packets in said data frame.

7. The method of claim 1, wherein said modifying step further comprises the step of interleaving by reordering data packets in said data frame to improve a burst data error rate.

8. The method of claim 1, wherein said data frame is stored in said first dispatch queue and said data frame is modified in said first dispatch queue in response to said analysis results.

9. The method of claim 1, wherein said data frame is modified in a digital signal processing unit and then stored in said first dispatch queue in response to said analysis results.

10. The method of claim 2, wherein said modifying step for a present data frame is in response to said analysis results of a previously received data frame.

11. The method of claim 2, wherein said processing of selected data of said data frame to generate said index further comprises the step of hashing selected transmission characteristic data of said data frame.

12. The method of claim 2, wherein said modifying step for a present data frame uses said analysis results of a previous data frame, said analysis results of said previous data frame accessed by an index generated by processing selected data of said present data frame.

13. An apparatus for managing network data traffic comprising:
   a plurality of dispatch queues having a hierarchy of transmission priorities;
   a receiving circuit to receive and store a data frame from a communication network, said data frame comprising a plurality of data packets and said data frame having first transmission characteristics;
   analysis circuit to analyze contents of said data packet to generate analysis results;
   a modify circuit to modify selected data of said data frame in response to said analysis results to generate a modified data frame;
   a first storage circuit to store said modified data frame in a first dispatch queue in response to said analysis results; and
   a dispatch circuit to dispatch, according to a queue transmission priority of said dispatch queue, said modified data frame from said first dispatch queue to said communication network.

14. The apparatus of claim 13, further comprising:
   an index circuit to generate an index of said analysis results by processing selected data of said data frame; and
   a second storage circuit to store said analysis results referenced by said index.

15. The apparatus of claim 13, wherein said first transmission characteristics comprise source and destination addresses, a data type, a data transmission rate, encoding latency, acceptable error rates, compressibility status, encryption status and a first transmission priority.

16. The apparatus of claim 13, wherein said modify circuit data encrypts selected data packets in said data frame.

17. The apparatus of claim 13, wherein said modify circuit compresses data in selected data packets in said data frame.

18. The apparatus of claim 13, wherein said modify circuit modifies, by reordering, data packets in said data frame to improve burst error rates of data transmission.

19. The apparatus of claim 13, wherein said modify circuit is part of said first dispatch queue and modifies said selected data of said data frame after said data frame is stored in said first dispatch queue.

20. The apparatus of claim 14, wherein said processing of selected data of said data frame to generate said index comprises hashing selected transmission characteristic data of said data frame.

21. The apparatus of claim 14, wherein said modification of a present data frame uses said analysis results of a previous data frame, said analysis results of said previous data frame accessed by an index generated by processing selected data of said present data frame.

22. A data processing system comprising:
   a central processing unit (CPU);
   random access memory (RAM);
   read only memory (ROM); and
   a bus system coupling said CPU to said ROM and said RAM, wherein said CPU comprises:
   circuitry to form a plurality of dispatch queues, said dispatch queues having a hierarchy of transmission priorities;
   circuitry to receive and store a data frame from a communication network, said data frame comprising a plurality of data packets and said data frame having first transmission characteristics;
   circuitry to analyze contents of said data packets and generate analysis results;
   circuitry to modify selected transmission characteristics of said data frame in response to said analysis results to generate a modified data frame;

circuitry to store said modified data frame in a first dispatch queue in response to said analysis results; and a dispatch circuit to dispatch, according to a queue transmission priority of said dispatch queue, said modified data frame from said first dispatch queue to said communication network.

23. The data processing system of claim 22, further comprising:

circuitry to generate an index of said analysis results by processing selected data of said data frame; and circuitry to store said analysis results referenced by said index.

24. The data processing system of claim 23, wherein said first transmission characteristic data comprises, source and destination addresses, a data type, a data transmission rate, encoding latency, acceptable error rates, compressibility status, encryption status and a first transmission priority.

25. The data processing system of claim 23, wherein said modify circuit assigns said queue transmission priority to said data frame.

26. The data processing system of claim 23, wherein said modify circuit data encrypts selected data packets in said data frame requiring secure transmission.

27. The data processing system of claim 23, wherein said modify circuit compresses data in selected data packets in said data frame.

28. The data processing system of claim 23, wherein said modify circuit modifies said data frame by reordering data packets to improve burst error rates of data transmission.

29. The data processing system of claim 23, wherein said modify circuit modifies said transmission characteristic data of a present data frame in response to said analysis results of a previously received data frame having said first selected transmission characteristic data.

30. The data processing system of claim 24, wherein said processing of selected data in said data frame to generate said index comprises hashing selected transmission characteristic data of said data frame.

31. The data processing system of claim 24, wherein said modification of a present data frame uses said analysis results of a previous data frame, said analysis results of said previous data frame accessed by an index generated by processing selected data of said present data frame.

* * * * *